United States Patent
Zhao et al.

(10) Patent No.: US 8,085,533 B2
(45) Date of Patent: Dec. 27, 2011

(54) ELECTRONIC DEVICE WITH SWITCHING ASSEMBLY

(75) Inventors: Er-Zheng Zhao, Shenzhen (CN); Chieh-Yu Lee, Taipei Hsien (TW); Hong-Wei Zhu, Shenzhen (CN); Hai-Yang Yu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 231 days.

(21) Appl. No.: 12/629,796

(22) Filed: Dec. 2, 2009

(65) Prior Publication Data

US 2011/0026197 A1 Feb. 3, 2011

(30) Foreign Application Priority Data

Jul. 31, 2009 (CN) .......................... 2009 1 0305068

(51) Int. Cl.
*G06F 1/16* (2006.01)
*E05C 17/56* (2006.01)

(52) U.S. Cl. ......... 361/679.58; 361/679.55; 361/679.26; 361/679.27; 292/251.5

(58) Field of Classification Search .......... 361/679.01–679.45, 679.55–679.59; 292/251.5, 121, 340; 70/58
See application file for complete search history.

(56) References Cited

U.S. PATENT DOCUMENTS

| | | | |
|---|---|---|---|
| 6,517,129 B1* | 2/2003 | Chien et al. | 292/251.5 |
| 7,405,927 B2* | 7/2008 | Lev | 361/679.55 |
| 7,637,540 B2* | 12/2009 | Chiang | 292/45 |
| 7,997,631 B2* | 8/2011 | Chen | 292/251.5 |
| 8,009,424 B2* | 8/2011 | Zhu et al. | 361/679.58 |
| 2005/0087993 A1* | 4/2005 | Lin | 292/45 |
| 2005/0168923 A1* | 8/2005 | Huang et al. | 361/683 |

* cited by examiner

*Primary Examiner* — Jayprakashi N Gandhi
*Assistant Examiner* — Nidhi Desai
(74) *Attorney, Agent, or Firm* — Altis Law Group, Inc.

(57) ABSTRACT

An electronic device includes a body, a cover, and a switching assembly. The body defines two first openings. The cover defines two second openings facing the two first openings. The switching assembly includes a locking assembly received in the body and a latching assembly received in the cover. The locking assembly includes a handle, two guiding members, and two magnetic members received in the corresponding guiding members. The handle is for impelling the guiding members to move. The latching assembly includes two latching members. Each latching member has a latching end for being attracted by one of the magnetic members. When the cover covers the body, each latching end protrudes through the corresponding second and first openings and is caught by the magnetic members. When the handle is pressed, the handle drives the two guiding members to move to impel the two magnetic members away from the corresponding latching ends.

9 Claims, 6 Drawing Sheets

ELECTRONIC DEVICE WITH SWITCHING ASSEMBLY

BACKGROUND

1. Technical Field

The present disclosure relates to electronic devices and, particularly, to an electronic device with a switching assembly.

2. Description of the Related Art

Portable electronic devices, such as portable computers, usually use a switching assembly to fasten a cover assembly to a base assembly. The switching assembly usually includes at least one hook. The hook usually protrudes out from the cover assembly. When the electronic device is in an unfolded state, the hook is exposed and prone to damage due to accidental or inadvertent collisions.

Therefore, it is desirable to provide an electronic device with a switching assembly to overcome or at least alleviate the above-mentioned problem.

DETAILED DESCRIPTION

Embodiments of the disclosure will now be described in detail with reference to the accompanying drawings.

Figure 1:
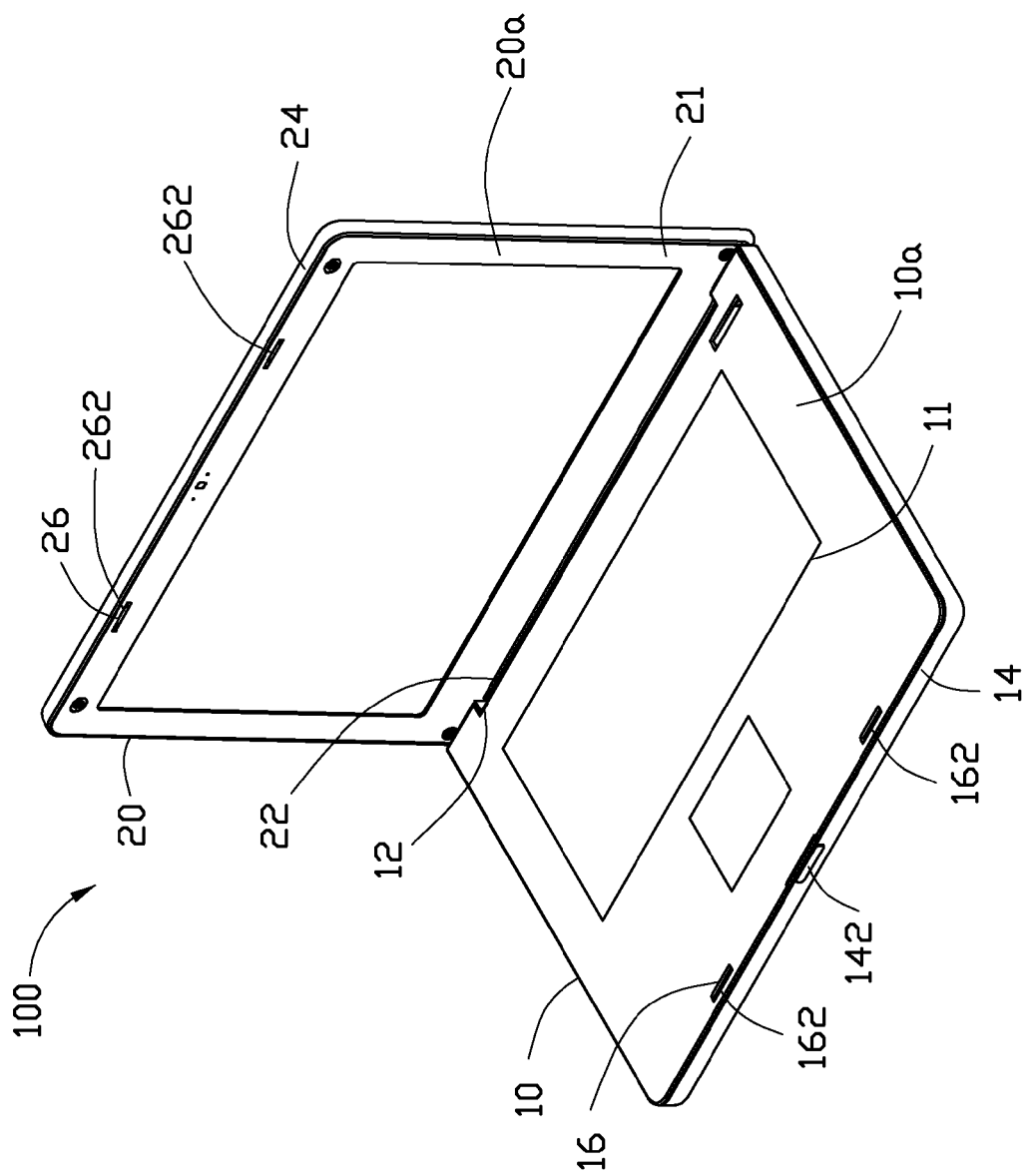
FIG. 1 is an isometric view of an electronic device, the electronic device includes a switching assembly which further includes a locking member and a latching member, according to an exemplary embodiment.
Figure 5:
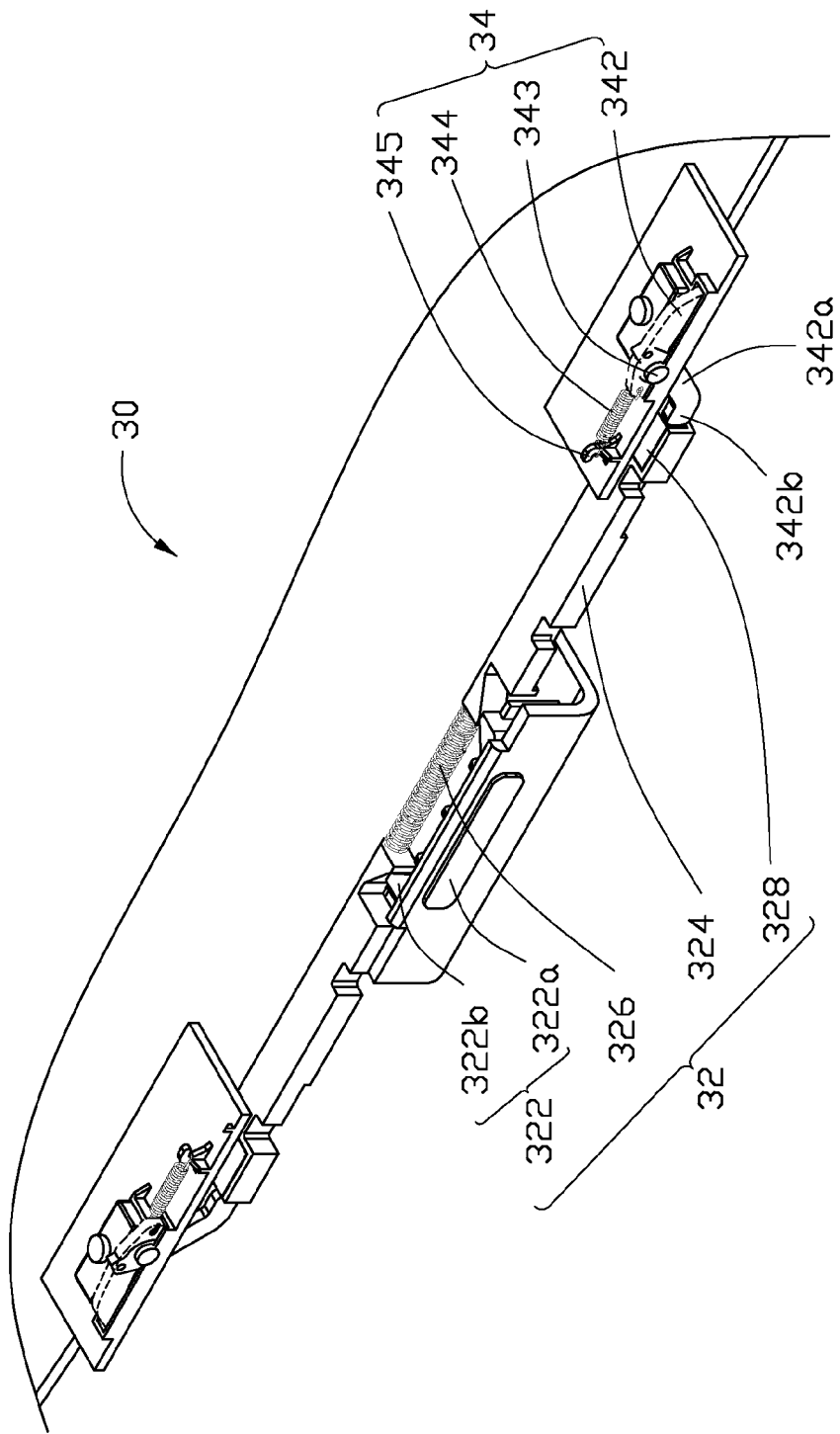
FIG. 5 is an isometric view of the switching assembly, showing the locking member is unlocked from the latching member.

Referring to FIGS. 1 and 5, an electronic device 100 according to an exemplary embodiment includes a body 10, a cover 20, and a switching assembly 30. The cover 20 is pivotally connected to the body 10. The cover 20 is locked to the body 10 to cover the body 10 via the switching assembly 30. In this embodiment, the electronic device 100 is a notebook, the body 10 includes a key-board 11 installed thereon, and the cover 20 includes a display screen 21 installed thereon.

The body 10 includes a first surface 10a facing the cover 20, a first side wall 12 substantially perpendicular to the first surface 10a, and a second side wall 14 substantially parallel and opposite to the first side wall 12. The body 10 defines a first receiving space 16, adjacent to the second side wall 14. The body 10 defines two openings 162 in the first surface 10a communicating with the first receiving space 16. The second side wall 14 defines a receiving hole 142 communicating with the first receiving space 16.

The cover 20 includes a second surface 20a facing the first surface 10a of the body 10, a third side wall 22 perpendicular to the second surface 20a, a fourth side wall 24 generally parallel and opposite to the third side wall 22. The second surface 20a defines a second receiving space 26 adjacent to the fourth side wall 24. The cover 20 is pivotally connected to the body 10 by pivotally connecting the first side wall 12 to the third side wall 22. The cover 20 defines two second opening 262 in the second surface 20a communicating with the second receiving space 26.

Figure 2:
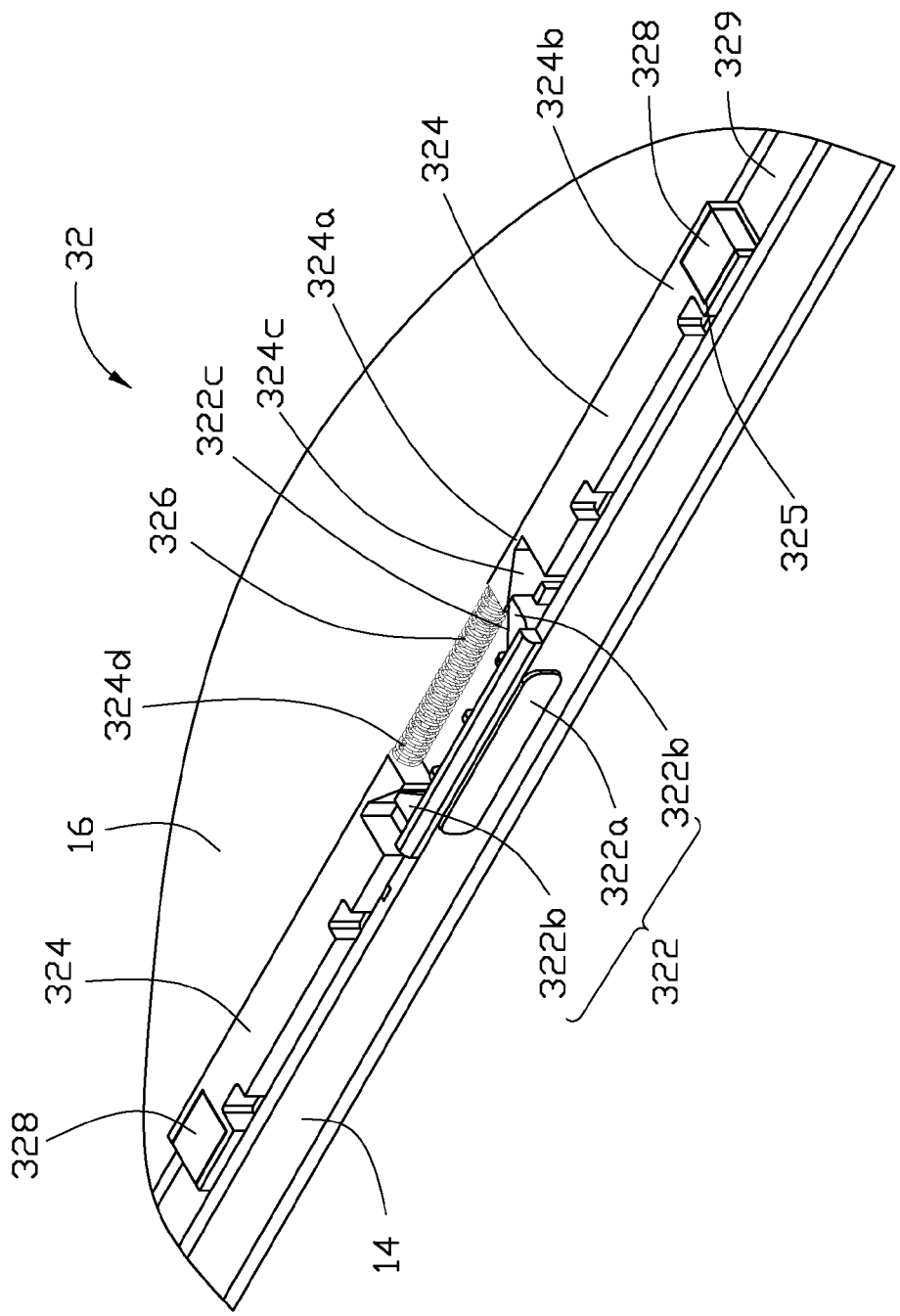
FIG. 2 is an isometric view of the locking member of FIG. 1.
Figure 3:
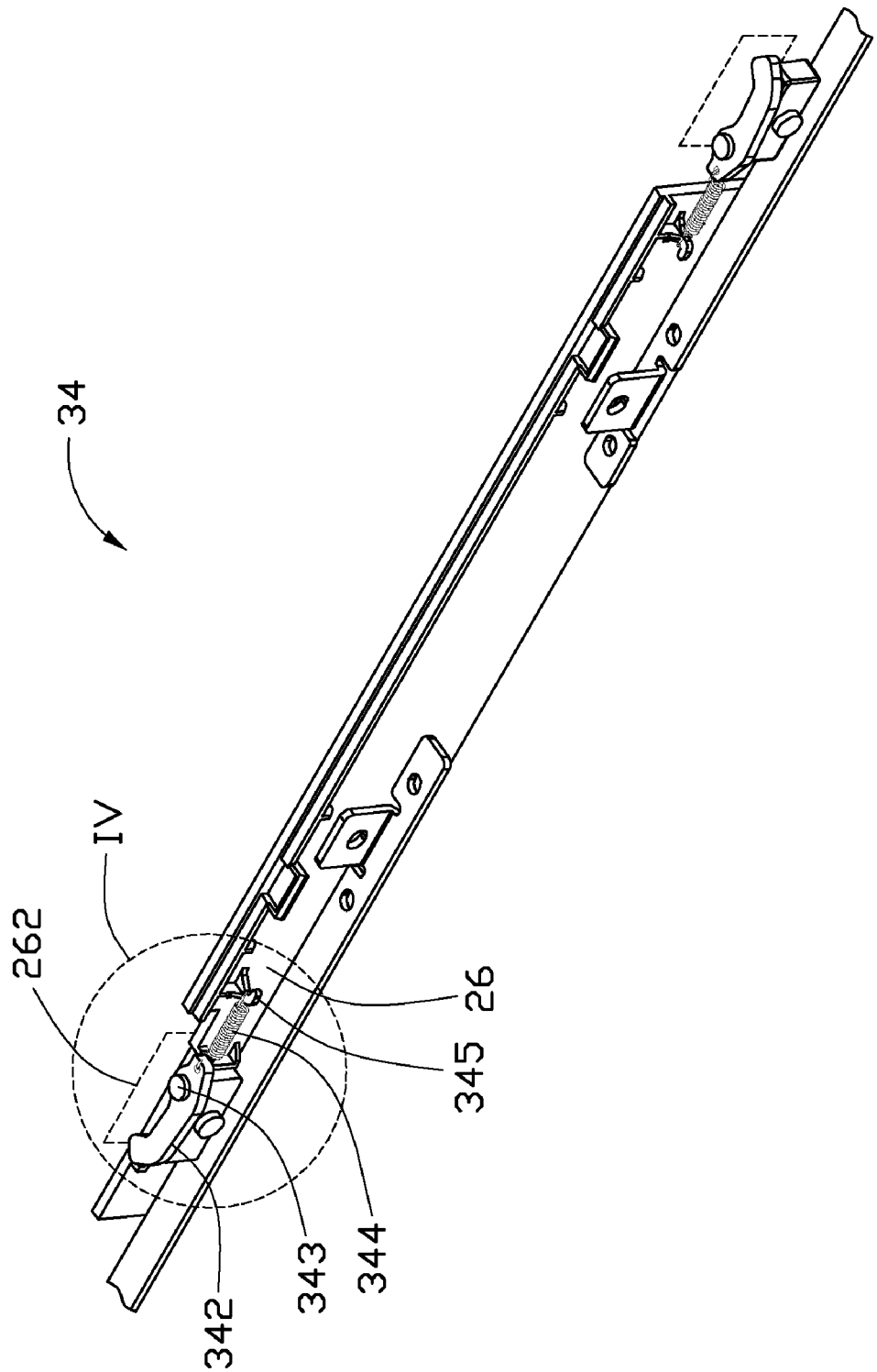
FIG. 3 is an isometric view of the latching member of FIG. 1.
Figure 6:
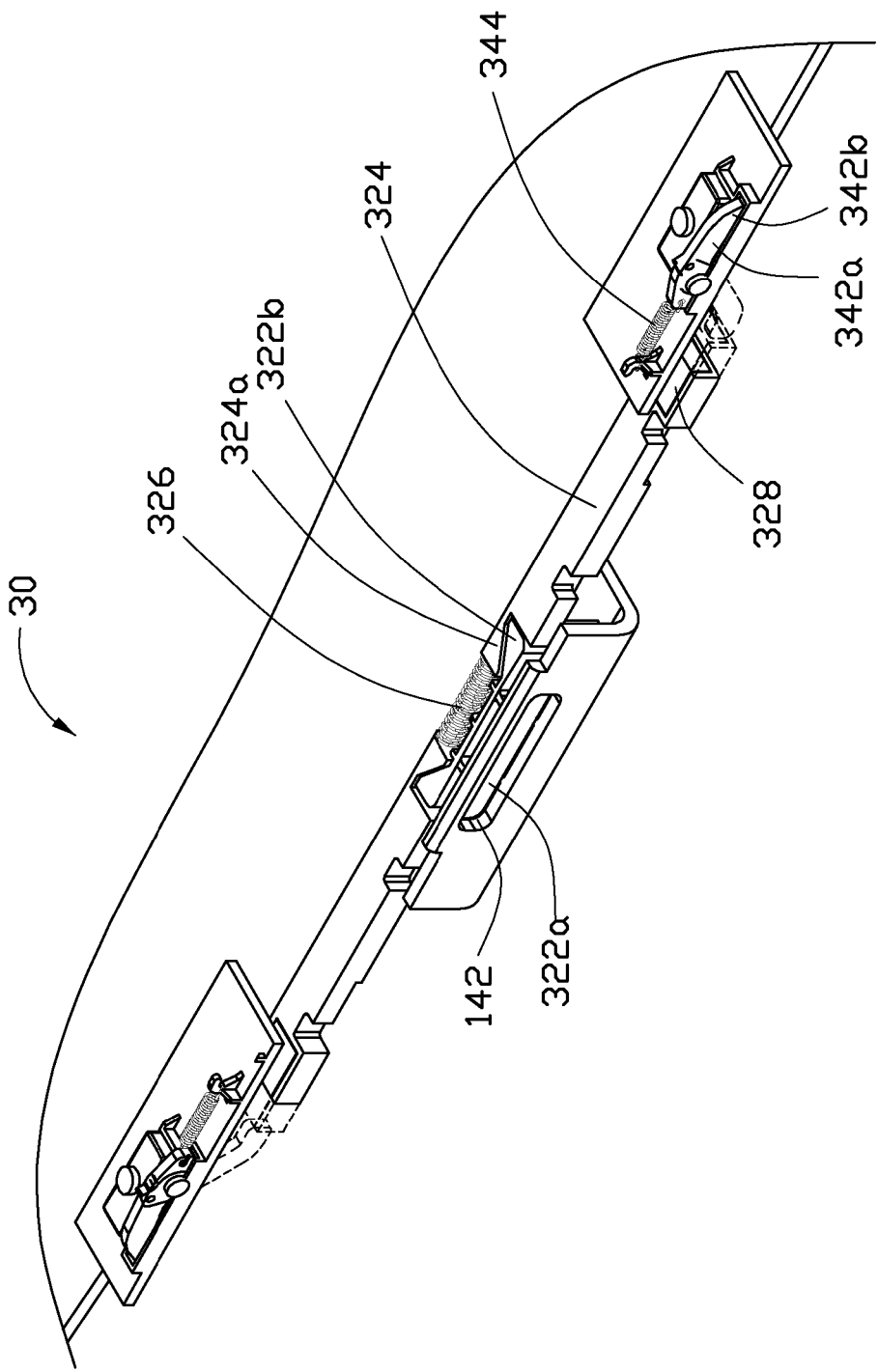
FIG. 6 is similar to FIG. 5, but showing the locking member is locked to the latching member.

Referring to FIGS. 5 and 6, the switching assembly 30 includes a locking assembly 32 and a latching assembly 34. Referring to FIG. 2, part of the switching assembly 30 is shown with the locking assembly 32 received in the first receiving space 16. Referring to FIG. 3, the latching assembly 34 is received in the second receiving space 26. When the cover 20 is folded and secured to the body 10, opposite ends of the latching assembly 34 protrude out of the second receiving space 26, through the second and first opening 262, 162 correspondingly, and secured to opposite ends of the locking assembly 32. When the cover 20 is unfolded, the latching assembly 34 is entirely received in the second receiving space 26.

Referring back to FIG. 2, the locking member 32 includes a handle 322, two guiding members 324, a first resilient member 326, and two magnetic members 328.

The handle 322 includes a pressing portion 322a and two pushing ends 322b. The two pushing ends 322b are formed on opposite ends of the pressing portion 322a correspondingly. The pressing portion 322a is received in the receiving hole 142. The two pushing ends 322b are received in the first receiving space 16. When the pressing portion 322a is pressed, the pressing portion 322a retreats into the first receiving space 16. The two pushing ends 322b each have a first inclined surface 322c facing each other.

Each guiding member 324 includes a resisting end 324a and a receiving end 324b on another side of the guiding member 324 opposite to the resisting end 324a. The resisting end 324a has a second inclined surface 324c corresponding to the first inclined surface 322c. The resisting end 324a includes a protrusion 324d. The first resilient member 326 is positioned between the two guiding members 324. The receiving end 324b defines a receiving groove 325 for receiving one of the magnetic members 328.

In this embodiment, the distance between the resisting ends of the two guiding members 324 is shorter than the first resilient member 326 at rest. As a result, the first resilient member 326 is compressed between the resisting ends 324a of the two guiding member 326. In this embodiment, the first resilient member 326 is an elastic member, such as a helical spring.

Referring to FIG. 3, the latching assembly 34 includes two latching members 342, two shafts 343, two second resilient members 344, and two securing blocks 345. The two shafts 343 are disposed in the second receiving space 26 aligned with the two second openings 262 correspondingly. Each securing block 345 is disposed in the second receiving space 26 and positioned besides the corresponding second opening 262.

Figure 4:
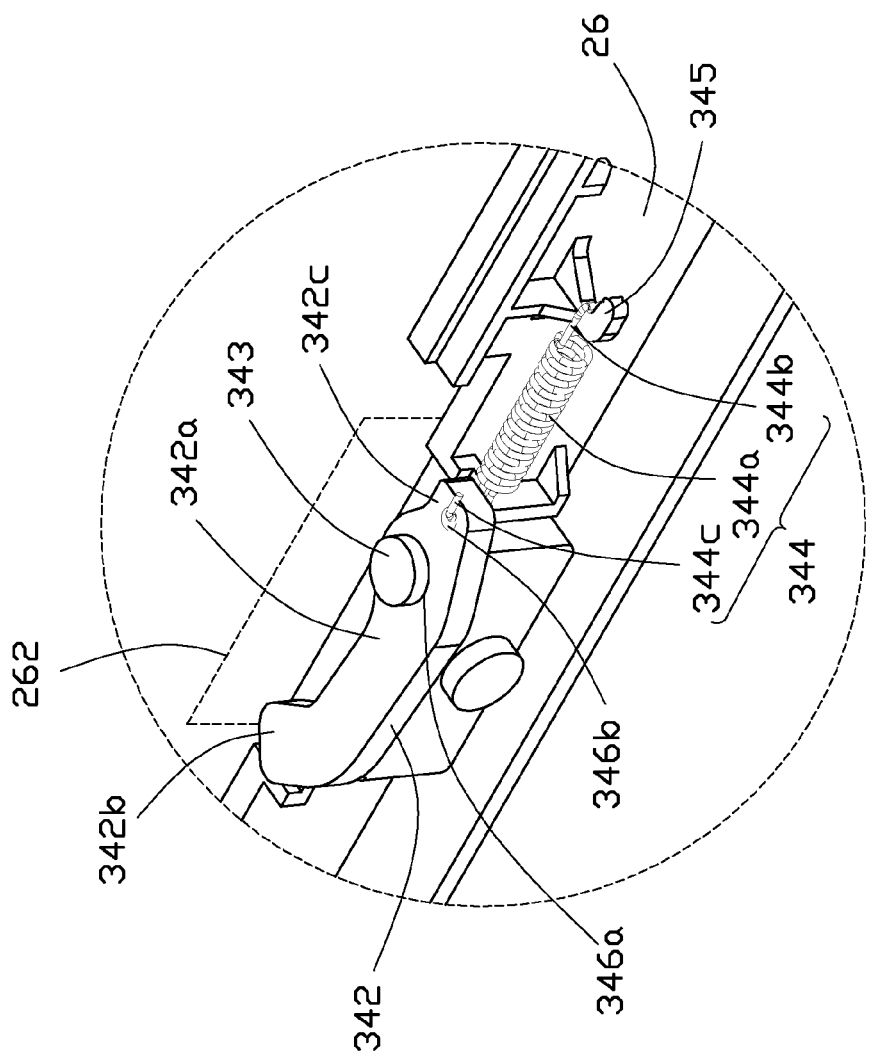
FIG. 4 is an enlarged view of the section IV, shown in FIG. 3.

Referring to FIG. 4, each latching member 342 includes a main body 342a, a latching end 342b, and a connecting end 342c. The latching end 342b and the connecting end 342c are disposed on opposite ends of the main body 342a. The main body 342a defines a first through hole 346a. The shaft 343 protrudes through the first through hole 346a to rotatably connect the latching member 342 to the body 10. The connecting end 342c defines a second through hole 346b. In this embodiment, the latching end 342b is made of iron.

Each second resilient member 344 includes a resilient body 344a, a securing ring 344b and a securing hook 344c. The securing ring 344b and the securing hook 344c are disposed on opposite ends of the resilient body 344a correspondingly. The second resilient members 344 are connected to the latching member 342 by the securing hook 344c engaged in the second through hole 346b correspondingly. Each second resilient member 344 is mounted in the second receiving space 26 by the securing ring 344b that sleeves around the securing block 345 of the latching assembly 34.

In this embodiment, the distance between the second through hole 346b and the securing block 345 of the latching assembly 34 is longer than the second resilient member 344 at rest, as a result, the second resilient member 344 is stretched between the securing block 345 and the latching member 342. In this embodiment, the second resilient member 344 is a spring.

Two sliding grooves 349 are defined in the bottom of the first receiving space 16. The guiding members 324 are placed in the two sliding grooves 349 correspondingly and are slidable along the sliding grooves 349.

Referring to FIGS. 1-2 and 5, when the cover 20 is folded to the body 10, the first openings 162 are aligned with the corresponding second opening 262 correspondingly, the two magnetic member 328 attract the latching ends 342b of the latching members 342 correspondingly. The magnetic members 328 attract the main bodies 342a of the latching member 342 to rotate around the shaft 343 of the cover 20, as a result, the latching ends 342b protrude through the second and first openings 262, 162, and are finally caught by the corresponding magnetic member 328. The cover 20 is therefore latched to the body 10.

Referring to FIG. 6, when the pressing portion 322a of the handle 322 is pressed, the handle 322 moves inwards into the first receiving space 16, the two pushing ends 322b of the handle 322 push the resisting ends 324b of the two guiding members 324 to move towards each other. The movement of the two guiding members 324 drives the two magnetic members 328 away from the latching end 322b of the latching members 342 correspondingly. Thus, the magnetic force of the magnetic members 328 on the latching ends 322b decreases. Finally, the latching members 342 are drawn back into the second receiving spaces 26 by the second resilient members 344. The cover 20 is unlatched from the body 10.

When the force applied to the pressing portion 322a is released, the first resilient member 326 pushes the two guiding members 324 to move away from each other, the movement of the two guiding members 324 drives the handle 322 to move out of the first receiving space 16 and to the initial position in the receiving hole 142.

It is to be understood, however, that even though numerous characteristics and advantages of the embodiments have been set forth in the foregoing description, together with details of the structures and functions of the embodiments, the disclosure is illustrative only, and changes may be made in details, especially in matters of arrangement of parts within the principles of the invention to the full extent indicated by the broad general meaning of the terms in which the appended claims are expressed.

What is claimed is:

1. An electronic device comprising: a body defining a first receiving space and comprising a first surface having two first openings defined in the first surface communicating with the first receiving space; a cover pivotally connected to the body, the cover defining a second receiving space and comprises a second surface facing the first surface of the body, the second surface having two second openings defined thereon corresponding to the two first openings; and a switching assembly configured for securing the cover to the body, the switching assembly comprising: a locking assembly received in the first receiving space, the locking assembly comprising a handle, two guiding members, and two magnetic members, the handle configured for impelling the guiding members to move, each guiding member comprising a receiving end formed on one side of the guiding member for receiving a corresponding magnetic member; and a latching assembly received in the second receiving space, the latching assembly comprising two resilient members and two latching members rotatably connected to the cover by the corresponding resilient member, each latching member comprising a latching end configured for being attracted by one of the corresponding magnetic members when the cover covers the body; wherein, when the cover covers the body, each latching end protrudes through the second and first openings and is caught by the corresponding magnetic member to secure the cover to the body, when the handle is pressed, the handle drives the two guiding members to move to impel the two magnetic members away from the latching ends of the latching members to unlock the cover from the body, and the latching members are drawn back into the second receiving space by the corresponding resilient members; wherein the body comprises a first side wall and a second side wall parallel and opposite to the first side wall, the first receiving space is close to the second side wall, the cover comprises a third side wall and a fourth side wall parallel and opposite to the third side wall, the second receiving space is close to the fourth side wall, the cover is pivotally connected to the body by pivotally connecting the first side wall to the third side wall; wherein the second side wall defines a receiving hole communicating with the first receiving space; wherein the handle comprises a pressing portion and two pushing ends, the two pushing ends are formed on opposite ends of the pressing portion, and the pressing portion is received in the receiving hole, and the two pushing ends are received in the first receiving space; and wherein the two pushing ends have two first inclined surfaces facing each other, each guiding member comprises a resisting end on another side of the guiding member opposite to the receiving end, the resisting end has a second inclined surface corresponding to one of the first inclined surface.

2. The electronic device of claim 1, wherein the resilient member is an elastic member.

3. The electronic device of claim 1, wherein each of the latching ends is made of iron.

4. The electronic device of claim 1, wherein the bottom of the first receiving space comprises two sliding grooves defined therein for slidably receiving the two guiding members correspondingly.

5. The electronic device of claim 1, wherein the locking member further comprises another resilient member, each of the resisting ends comprises a protrusion, the another resilient member is positioned between the protrusions.

6. The electronic device of claim 5, wherein the another resilient member is an elastic member.

7. The electronic device of claim 1, wherein the latching assembly further comprises two shafts disposed in the second receiving space aligned with the two second openings correspondingly, each latching member comprises a main body, the latching end disposed on one end of the main body, the main body defines a first through hole corresponding to the shaft of the locking assembly, the shaft protrudes through the first through hole to rotatably connect the latching member to the body.

8. The electronic device of claim 7, wherein the latching assembly further comprises two securing blocks disposed in the second receiving space and positioned besides the second openings correspondingly, each resilient member of the latching assembly comprises a resilient body, a securing ring disposed on one end of the resilient body, and is mounted in the second receiving space by the securing ring that sleeves around the correspondingly securing block of the latching assembly.

9. The electronic device of claim 8, wherein each latching member further comprises a connecting end opposite to the latching end, the connecting end defines a second through hole corresponding to the securing hook, each resilient member of the latching assembly further comprises a securing hook opposite to the securing ring, and is connected to the corresponding latching member by the securing hook that hooks the second through hole.

* * * * *